United States Patent [19]

Fox et al.

[11] Patent Number: 5,268,788
[45] Date of Patent: Dec. 7, 1993

[54] DISPLAY FILTER ARRANGEMENTS

[75] Inventors: Ian D. Fox, Wymans Brook; John E. Lee, Winchcombe, both of England

[73] Assignee: Smiths Industries Public Limited Company, London, England

[21] Appl. No.: 897,749

[22] Filed: Jun. 12, 1992

[30] Foreign Application Priority Data

Jun. 25, 1991 [GB] United Kingdom ............. 9113684

[51] Int. Cl.$^5$ ............................ G02B 5/20; G02B 5/30
[52] U.S. Cl. ................................ 359/490; 359/498; 359/589; 359/590; 358/240; 358/253
[58] Field of Search .............. 359/490, 493, 498, 589, 359/590; 358/240, 253

[56] References Cited

U.S. PATENT DOCUMENTS

| 4,007,396 | 2/1977 | Wisbey et al. ............ 359/493 |
| 4,515,442 | 5/1985 | Aron . |
| 4,747,674 | 5/1988 | Butterfield et al. ............ 359/590 |
| 4,944,579 | 7/1990 | Egan ............ 359/498 |

FOREIGN PATENT DOCUMENTS

| 1337044 | 11/1973 | United Kingdom . |
| 1522145 | 8/1978 | United Kingdom . |
| 1594288 | 7/1981 | United Kingdom . |

Primary Examiner—Martin Lerner
Attorney, Agent, or Firm—Pollock, Vande Sande and Priddy

[57] ABSTRACT

A display especially for viewing by a night-vision aid has an array of LED's which emit green light. A dichroic filter is located in front of the display and transmits radiation at the peak emission of the diodes but reflects radiation in the range to which the night-vision aid is sensitive. A bandpass filter located in front of the dichroic filter prevents transmission of longer wavelengths, and a circularly polarizing filter in front of the bandpass filter prevents transmission of radiation reflected specularly from surfaces behind it.

3 Claims, 1 Drawing Sheet

DISPLAY FILTER ARRANGEMENTS

BACKGROUND OF THE INVENTION

This invention relates to display filter arrangements and to display assemblies including filter arrangements.

Optically-emitting displays, especially in aircraft applications, often require optical filtering, such as for contrast enhancement or for the selection of particular color or wavelength bands. In aircraft applications, displays have to be clearly visible throughout a wide range of different ambient lighting conditions ranging from darkness to full sunlight, which might be 1500001 lux. In conditions of high illumination, there is a problem that ambient light incident on the display will be reflected from the cover glass, filters or other surfaces and will swamp out the light emitted from the display itself, rendering it illegible. The amount of light reflected from the surfaces of the display can be greatly reduced by the use of anti-reflection coatings. These, however, cannot be used on every surface, such as the internal surface of a CRT which is coated with a phosphor layer. To overcome the problem of reflection from these layers, it is usual to employ some form of contrast enhancement technique. This may take the form of a filter that absorbs all visible radiation except that emitted by the display. Alternatively, a circularly polarizing filter can be used to remove specular reflections from any surface behind the filter. Although these techniques help to improve the readability of the display, they do not provide a complete solution over the range of ambient lighting conditions likely to be encountered.

In aircraft or other vehicle applications, displays may need to be compatible with night-vision goggles. These goggles improve the ability of the pilot or other wearer to see poorly illuminated objects outside the aircraft, by amplifying what low levels of radiation are received by the goggles. Such goggles can have a gain of about 2000 and typically are responsive to radiation in the wavelength range of 620 nm to 930 nm. In order to prevent light emitted by the aircraft displays swamping the goggles, it is necessary for the light emitted by the displays to be confined outside this range of wavelengths, such as by a suitable choice of light-emitting diode (LED) elements and phosphors etc together with filters in front of the displays that remove light in the range to which the goggles are sensitive. For example, with a green LED display the emission peak is 570 nm which is close to the shorter wavelength end of the goggle characteristics. Because the emission of LED's is not narrowly defined, there will be overlap, at the longer wavelengths, with the goggle's characteristics. One solution would be to use absorptive filters to remove unwanted radiation with wavelengths greater than 620 nm. The problem, however, with most filters is that they do not have a very sharp cut-off. If, therefore, the radiation to which the goggles are sensitive is to be reduced sufficiently to prevent swamping the goggles, the effect of the filter will also be to reduce appreciably the amount of light transmitted through the filter at the LED's emission peak. This, consequently, reduces the visibility of the display in normal viewing conditions, especially when there is high ambient lighting. There are also other applications where it is necessary to provide a highly selective filter, such as in triple band pass filters used with color CRT displays.

BRIEF SUMMARY OF THE INVENTION

It is an object of the present invention to provide a display filter arrangement that can be highly selective of required wavelengths.

According to one aspect of the present invention there is provided a display filter arrangement including a dichroic filter and a circularly polarizing filter, the dichroic filter being located on a side of the arrangement closer to a display and being arranged to transmit a first range of wavelengths and to reflect a second range of wavelengths, the circularly polarizing filter being located on the opposite side of the arrangement such as to reduce the amount of radiation reflected specularly from surfaces behind the polarizing filter.

The arrangement preferably includes a bandpass filter located on a side of the dichroic filter remote from the display, the bandpass filter being effective to reduce transmission through the bandpass filter of radiation of wavelengths reflected by the dichroic filter. The bandpass filter is preferably located between the dichroic filter and the circularly polarizing filter.

According to another aspect of the present invention there is provided a display assembly including a display and a display filter arrangement according to the above one aspect of the invention located in front of the display.

The display may be provided by light-emitting diodes which may emit green light with an emission peak of around 570 nm, the dichroic filter transmitting radiation at 570 nm and reflecting radiation at wavelengths between about 620 nm and 780 nm. The bandpass filter preferably prevents transmission of radiation with wavelengths longer than about 750 nm.

According to a further aspect of the present invention there is provided a display filter arrangement for use with a display and a night vision aid of the kind that amplifies low level light within a predetermined range of wavelengths, the arrangement including a dichroic filter that reflects radiation in a range of wavelengths including the predetermined range of wavelengths and a circularly polarizing filter located intermediate the dichroic filter and the user, the polarizing filter being arranged to reduce the amount of radiation reflected specularly from surfaces behind the polarizing filter. A bandpass filter may be located on a side of the dichroic filter remote from the display, the bandpass filter being effective to reduce transmission through the bandpass filter of radiation in the predetermined range of wavelengths. The predetermined range of wavelengths may be from about 620 nm to 930 nm, the dichroic filter reflecting radiation at wavelengths from about 620 nm to 780 nm, and the bandpass filter preventing transmission of radiation with wavelengths longer than about 750 nm.

A display for an aircraft, in accordance with the present invention, will now be described, by way of example, with reference to the accompanying drawings.

DESCRIPTION OF THE PREFERRED EMBODIMENTS

Figure 1:
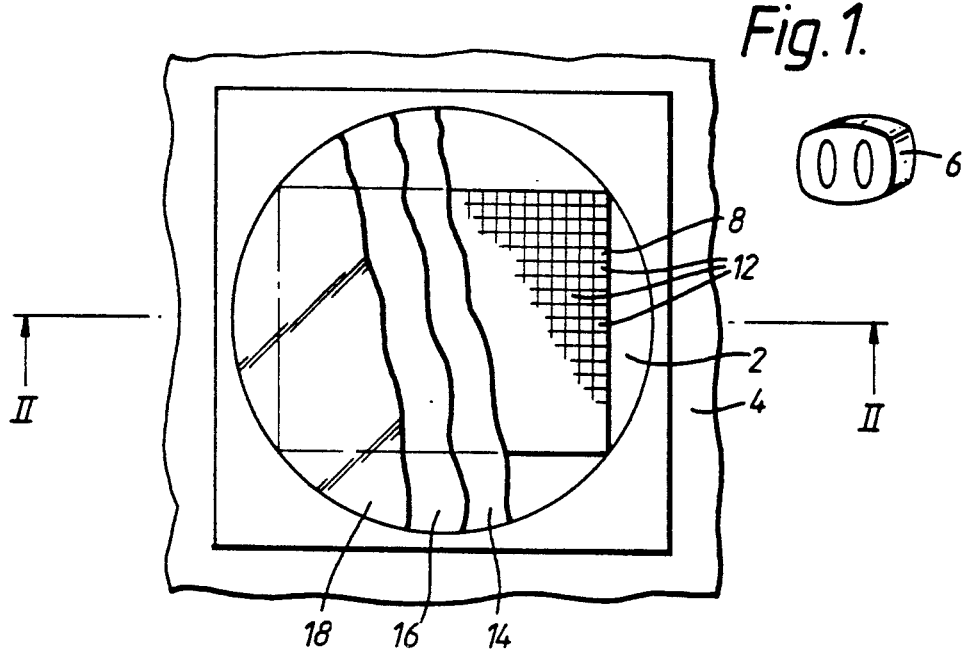
FIG. 1 is a partly cut away front elevation view of the display.
Figure 2:
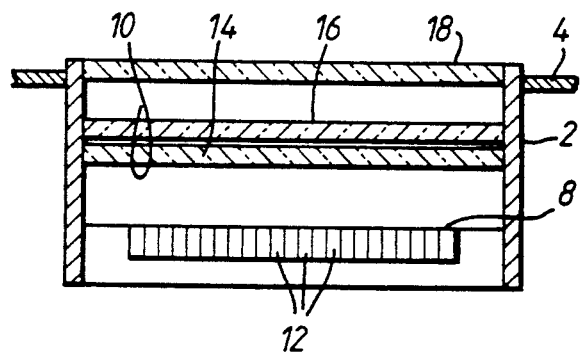
FIG. 2 is a sectional side elevation along the line II—II of FIG. 1.

The display assembly 2 is mounted in an aircraft flight deck instrument panel 4 and is for viewing in all illumination conditions from full sunlight to total darkness, and with night-vision goggles 6. The display assembly 2 includes a light-emitting display 8 and a filter arrangement 10 mounted in front of the display which reduces the amount of radiation emitted by the assembly in the range of wavelengths to which the night-vision goggles are sensitive.

Figure 3:
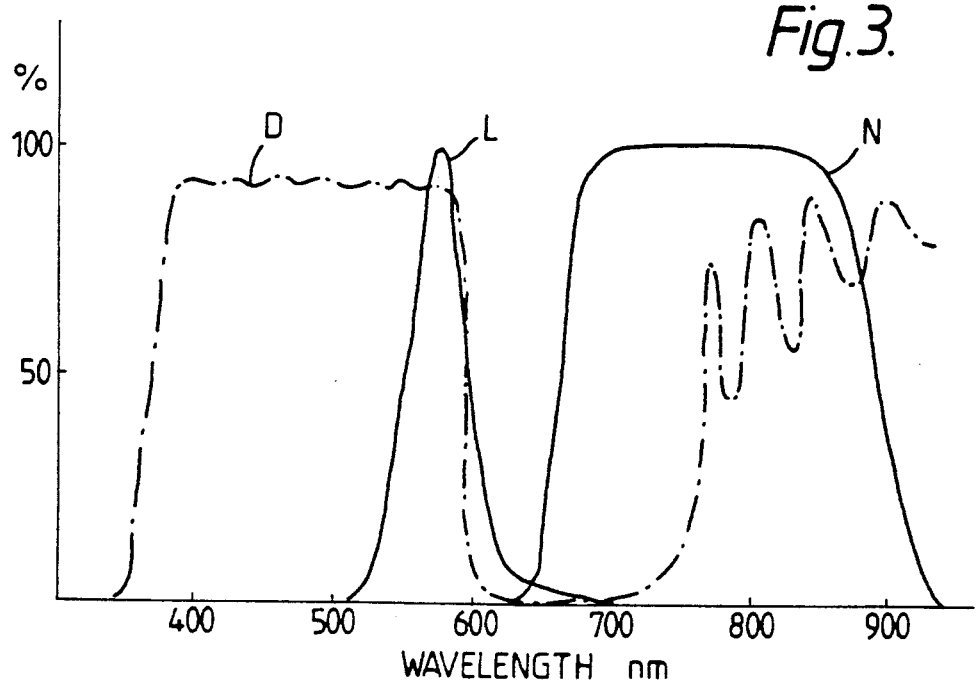
FIG. 3 illustrates the response of various parts of the display.

The light-emitting display 8 is a matrix array of light-emitting diodes 12 which emit green light with an emission peak of 570 nm. The radiation emitted from the LED's 12 is, however, spread out over a range of wavelengths from about 510 nm to 720 nm, as shown by the curve marked L in FIG. 3. This compares with the response of the night-vision goggles 6 which is shown by the curve marked N in FIG. 3 and which extends from about 620 nm to 930 nm. In the region under the flat part of the curve N, which is mainly in the red and infra-red parts of the spectrum, the goggles 6 have a gain of approximately 2000. It can be seen that there is a region between about 620 nm and 720 nm where there will be emission of radiation from the LED's 12 which would be amplified by the goggles 6 if provision were not made to prevent this.

The filter arrangement 10 comprises three filters 14, 16 and 18 mounted one in front of the other, in front of the display 8. The filter 14 closest to the display 8 is a dichroic filter with a transmission characteristic of the kind shown by the curve D in FIG. 3. This has good transmittance at the LED emission peak of 570 mn, and a sharply defined cut off by 620 nm. Radiation at wavelengths from 620 to 780 nm will be reflected from the filter 14 on both sides. Thus, radiation emitted by the display LED's 12 outside this band will be reflected from the rear face of the filter 14, facing the display 8. Radiation incident on the opposite side of the filter 14, from ambient lighting, will be treated in the same way, that is, radiation in the transmission range of wavelengths including the LED emission peak of 570 nm will pass through the filter whereas other radiation will be reflected. If used by itself, the filter 14 would transmit the green light of the display 8 but would appear red when illuminated by ambient light. In high ambient lighting conditions, therefore, the red reflected light would swamp the transmitted green light and make the display illegible.

Located in front of the dichroic filter 14 is an infrared bandpass filter 16. This filter 16 has a relatively broad transmission characteristic which allows transmission of radiation in the range 380 nm to 750 nm and prevents transmission outside this range. The IR filter 16 has the effect of reducing radiation from the display in the range 750 nm to 1100 nm, that is, over the major part of the range of response of the night-vision goggles 6. The IR filter 16 can be spaced from the dichroic filter 14, as shown, or laminated to it, so as to reduce interface reflection.

The final filter of the arrangement 10 is a circularly polarizing filter 18 which is located on that side of the IR filter 16 remote from the display 8, that is, between the IR filter and the user. The polarizing filter 18 eliminates, or substantially reduces, radiation from all specularly reflecting surfaces including the surfaces of the IR filter 16, the dichroic filter 14 and the display 8. Thus, any radiation reflected by the dichroic filter 14 which has not been removed by the IR filter 16, will be removed or substantially reduced by the polarizing filter 18. This combination of a dichroic filter, with its well-defined transmission band, behind a circularly polarizing filter, is therefore especially effective in display applications where the display emission needs to be a well-defined spectral band and where daylight legibility is important. The front surface of the circularly polarizing filter preferably has an anti-reflection coating.

When viewed in darkness, using the night-vision goggles 6, the combination of the dichroic filter 14 and the IR filter 16 behind the circularly polarizing filter 18 is particularly effective in reducing the amount of radiation emitted by the display within the range of response of the night-vision goggles to a level that is so low it will not swamp the goggles.

When viewed in full sunlight, the ambient light in the visible range will pass through the circularly polarizing filter 18 and the IR blocking filter 16. The dichroic filter 14 will transmit a controlled band of wavelengths and will reflect the rest. The light which is incident on the rear face of the circularly polarizing filter 18, therefore, will comprise the light emitted by the LED's 12, the light reflected from the surface of the display 8 and light reflected from the dichroic filter 14 and the IR filter 16. The circularly polarizing filter 18 significantly reduces all the reflected radiation, so the light emerging is substantially only light emitted by the LED's 12. Light reflected from the front surface of the polarizing filter 18 is reduced by an anti-reflection coating.

The display filter arrangement of the present invention, therefore, provides a display with good daylight legibility which is also compatible with night-vision goggles or similar low-light viewing aids.

The dichroic filter and any further filters may be formed by dielectric thin films deposited separately or in combination on one or more substrates, such as the circularly polarizing filter. Alternatively, the complete filter arrangement might be an assembly of separate parts, or laminated together. The front surface of the filter arrangement preferably has an anti-reflection coating.

In some applications, the need for extended infrared blocking may not be necessary. In such circumstances the IR filter 16 could be omitted.

The term dichroic has been used to include any filter which transmits radiation in one band of wavelengths and reflects radiation at wavelengths outside this band. This includes filters, such as edge filters, which operate outside the visible range of wavelengths.

The display filter arrangement is not confined to displays for use with night-vision goggles but could be used in other display applications where it is desired to have a highly selective filter such as, for example, a triple band pass filter for use with color CRT displays.

What we claim is:

1. A display assembly comprising a display and a filter arrangement located in front of the display, wherein the display includes light-emitting diodes emitting green light with an emission peak around 570 nm, and wherein the filter arrangement comprises: a dichroic filter; means mounting the dichroic filter on a side of the filter arrangement closer to the display, the dichroic filter transmitting radiation at 570 nm and reflecting radiation at wavelengths between about 620 nm and 780 nm; a circularly polarizing filter; and means mounting the circularly polarizing filter on an opposite side of the filter arrangement, the polarizing filter reducing the amount of radiation reflected specularly from surfaces behind the polarizing filter.

2. A display assembly according to claim 1, wherein the filter arrangement includes a bandpass filter, that prevents transmission of radiation with wavelengths longer than about 750 nm.

3. A display filter arrangement for use with a display and a night vision aid of the kind that amplifies low level light within a predetermined range of wavelengths between about 620 nm and 930 nm, wherein the filter arrangement comprises a dichroic filter; means mounting the dichroic filter on a side of the arrangement close to the display, the dichroic filter transmitting radiation in a first range of wavelengths and reflecting radiation in a second range of wavelengths from about 620 nm to 780 nm; a circularly polarizing filter; means mounting the circularly polarizing filter intermediate the dichroic filter and a viewer, the polarizing filter reducing the amount of radiation reflected specularly from surfaces behind the polarizing filter; and a bandpass filter effective to reduce the amount of radiation transmitted through the bandpass filter in the said predetermined range of wavelengths.

* * * * *